Jan. 5, 1960 V. W. MIENER 2,919,946
TRUNK LID-HOLDING DEVICE
Filed Sept. 9, 1957
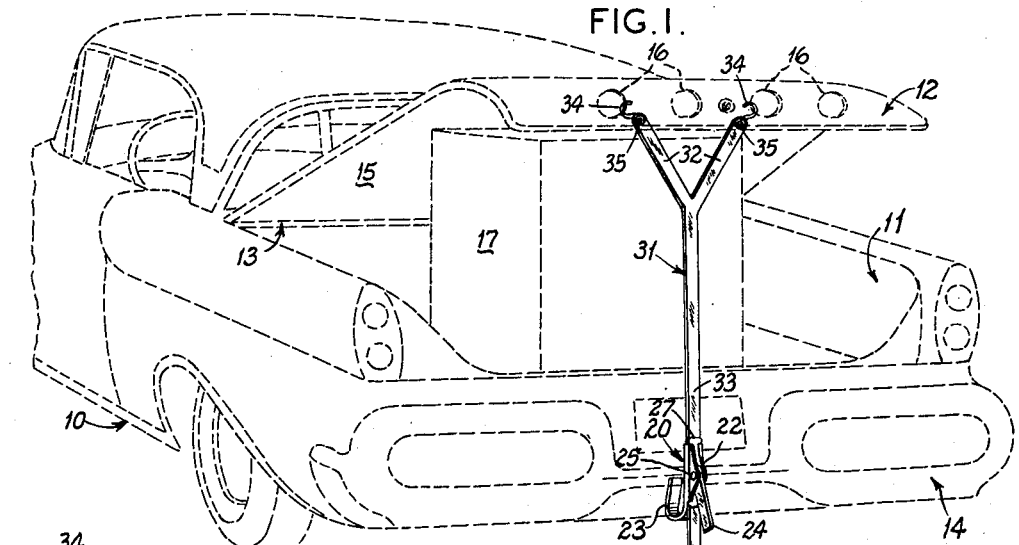
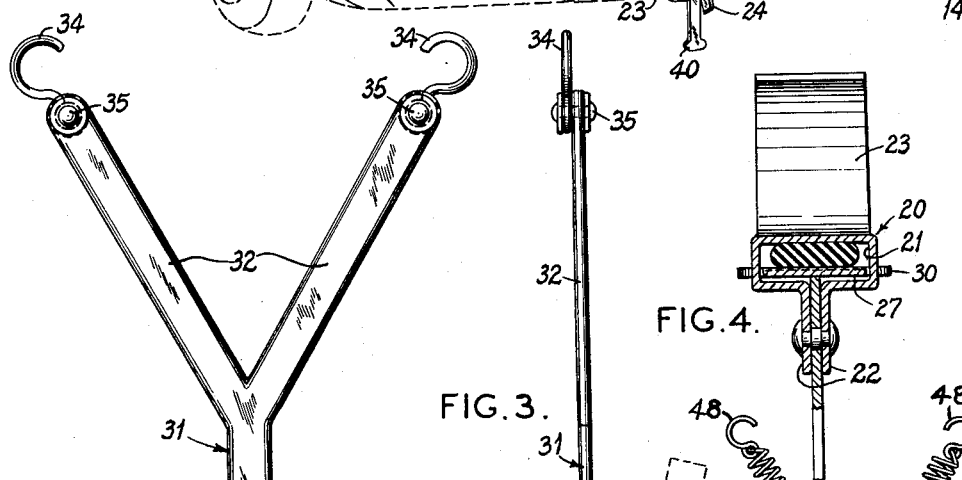
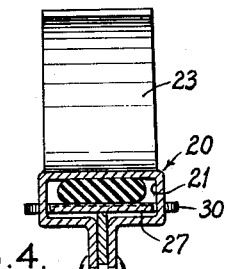
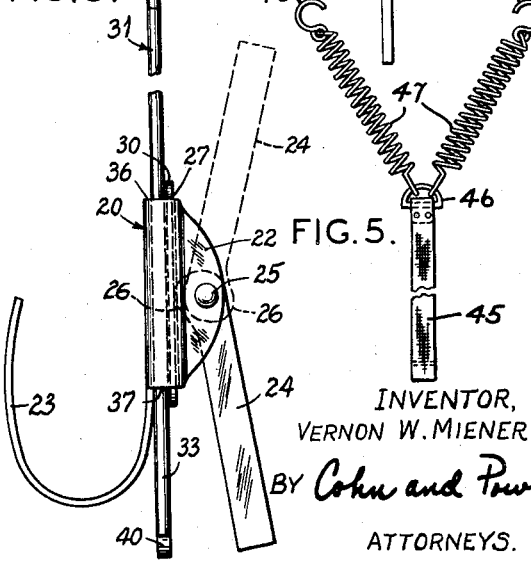
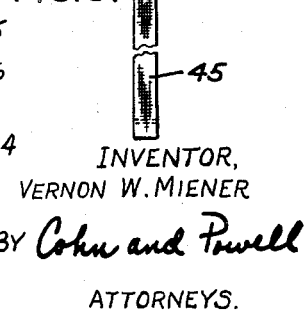
INVENTOR,
VERNON W. MIENER
BY Cohn and Powell
ATTORNEYS.

United States Patent Office 2,919,946
Patented Jan. 5, 1960

2,919,946

TRUNK LID-HOLDING DEVICE

Vernon W. Miener, Highland, Ill.

Application September 9, 1957, Serial No. 682,876

6 Claims. (Cl. 292—288)

This invention relates generally to improvements in a trunk lid-holding device, and more particularly to an improved accessory adapted to be utilized to retain an automobile trunk lid when such lid cannot be completely closed and latched because of articles extending out of the trunk compartment.

When articles such as boxes, suitcases and the like are placed or stored in the trunk compartment of an automobile, in many cases because of the bulk of the object or objects or because of overloading, the trunk lid cannot be fully closed and latched. The lid, under such conditions, remains in a partly opened position and rests on the objects contained in the trunk compartment. Consequently, there is a possibility of the lid being hingedly moved up and down upon subsequent transporting of the automobile, which could result in either damage to the lid, damage to the stored objects on which the lid rests, or result in loss of the objects from the trunk compartment.

It is an important object of the present invention to provide a device which can be readily attached to the lid and to another part of the automobile under the above described circumstances which will hold the lid tightly in place and prevent the possibility of damage and loss.

Another important objective is achieved by the provision of a strap means connected operatively to the trunk lid that affords a resilient action, and by the structural arrangement of the strap to a clamping element which enables a quick adjustment of the strap for the lid height and enables substantially the same predetermined resilient force to be applied to the lid regardless of such lid height.

Still another important object is realized by the structure comprising one end of the resilient strap means and by the fastening elements on such structure which permit the use of apertures provided in the underdeck panel of the conventional trunk lid of present day automobiles for attaching the lid-holding device to the lid.

Yet another important object is afforded by the structure of the clamp element and its relationship with the strap means, whereby to enable the adjustment feature mentioned previously, to permit a clamping engagement of the strap means to permit application of any desired resilient force to the trunk lid, to enable the clamp element to be attached to a bumper below the lid, and to preclude unintentional detachment of the clamp element and the strap means.

Other important advantages are achieved by the particular structure of the socket portion of the clamp element adapted to receive slidably a strap, and by the provision of a plate member in the socket portion adapted to fix the strap in adjusted position and yet prevent mutilation of the strap by the specific latch means.

Another important object is realized by providing a device that is simple and durable in construction, efficient in operation, economical to manufacture, and capable of ready use and attachment by anyone without requiring any complicated instructions.

The foregoing and numerous other objects and advantages of the invention will more clearly appear from the following detailed description of two embodiments, particularly when considered in connection with the accompanying drawing, in which:

Fig. 1 is a perspective view of the trunk lid-holding device showing the device attached to the trunk lid and bumper of an automobile;

Fig. 2 is a fragmentary front elevational view of the trunk lid-holding device;

Fig. 3 is a fragmentary, side elevational view of the lid-holding device shown in Fig. 2, the latch arm being shown in dotted lines to indicate the release position;

Fig. 4 is an enlarged view in cross section as seen along line 4—4 of Fig. 2, and Fig. 5 is a reduced, fragmentary side elevational view of a modified structure of the lid-holding device.

Referring now by characters of reference to the drawing, and first to Fig. 1 in which is illustrated the environment and application of the trunk lid-holding device. An automobile generally indicated at 10 includes the usual rear trunk compartment designated 11 adapted to be closed by a trunk lid referred to at 12, the lid 12 being hinged in the conventional manner to the rear deck of the car at the place indicated by reference numeral 13 immediately behind the rear window. Further, the automobile 10 includes a rear bumper 14 located below the trunk compartment 11 and trunk lid 12. The trunk lid 12 is constructed to provide an underdeck panel 15 in which a plurality of spaced apertures 16 are provided, the function and purpose of such apertures 16 being described subsequently in detail.

When an article such as a box 17 is placed in trunk compartment 11, and the size of box 17 precludes trunk lid 12 from being lowered to a fully closed position, the lid 12 will seat on box 17 and assume an angular position which leaves the trunk compartment 11 open as is shown clearly in Fig. 1. In order to prevent damage to the trunk lid or to the box 17 or prevent loss of the box from the trunk compartment, the trunk lid 12 must be held down tightly against the article 17 contained in the trunk compartment 11. The subject lid-holding device may be quickly and easily attached in a manner which will be fully described later, to provide this function.

The lid-holding device includes a clamp 20 formed of a sheet plate material into an elongate hollow T-shaped configuration as best shown in cross section in Fig. 4. The clamp 20 consists of a socket portion 21 and spaced ears 22. A U-shaped hook formation 23 is integrally formed with the lower part of socket portion 20 and is adapted to fit and engage the under side of automobile bumper 14 as illustrated in Fig. 1.

A latch arm 24 is located between and pivotally connected by pivot pin 25 to spaced ears 22. The latch arm 24 is provided with an eccentric cam portion 26 that is adapted to extend into and out of socket portion 21 upon pivotal movement of arm 24.

Located in socket portion 21 is a clamp plate 27, each end of which is provided with an enlarged ear portion 30 extending out of and adapted to engage the adjacent end of socket portion 21 to prevent removal and detachment of plate 27 from the clamp 20.

Located between clamp 20 and automobile lid 12 is a resilient strap 31 constituting a resilient member formed preferably of a resilient material such as rubber or the like. The strap 31 is formed substantially in a Y-shape having divergent upper strap arms 32 and an integral depending strap arm 33. A hook 34 is pivotally mounted by a pin 35 to the upper end of each strap arm 32, the hooks 34 being preferably arranged so that the bights are disposed in face-to-face relation.

The depending strap arm 33 is slidably received in socket portion 21 of clamp 20, the arm 33 extending through the open top 36 and extending through the open bottom 37. The lower end of strap arm 33 is provided with an enlarged head portion 40 that is adapted to engage the lower side of socket portion 21 to prevent detachment of strap 31 from clamp 30. The strap arm 33 is located in socket portion 21 adjacent the rear side of plate 27 opposite latch arm 24. In other words, the plate 27 is located between strap arm 33 and latch arm 24. The rear surface of plate 27 immediately adjacent strap arm 33 is knurled to provide a friction surface adapted to engage the strap arm portion located in socket portion 21 of clamp 20, and hence aids in preventing slippage of the strap when held by clamp arm 24.

When a box or other article 17 is placed in the trunk compartment 11, the trunk lid 12 is prevented from closing and hence assumes the position shown in Fig. 1. The subject device is utilized to hold the trunk lid 12 securely in place.

First, the hooks 34 are located in spaced apertures 16 provided in the underdeck panel 15 of lid 12. Then, the hook formation 23 of clamp 20 is located under bumper 14 immediately below lid 12. The lower strap portion extending below socket portion 21 of clamp 20 is pulled so that the length of strap 31 is adjusted for the lid height. After adjusting for the lid height, the strap 31 is pulled further through socket portion 21 to stretch the resilient strap and hence provide a downwardly directed tensional force on trunk lid 12. When stretched sufficiently to hold lid 12 securely in place, the latch arm 24 is lowered from its raised position shown in dotted lines in Fig. 3 to its lowered position shown in full lines. As a result, the eccentric cam portion 26 engages the knurled surface of plate 27 and urges the plate 27 inwardly against the depending strap arm 33 located in socket portion 21, whereby to clamp the strap arm 33 securely in position. It will be particularly noted that resilient strap 31 transmits to trunk lid 12 at all times a downwardly directed tensional force.

Furthermore, because of the particular structure of resilient strap 31, i.e. the divergent arms 32 and integral depending arm 33, and the particular disposition of hooks 34, the hooks 34 engage apertures 16 in a manner to prevent unintentional detachment. The greater the tensional pull downwardly on strap 31 the greater force will be applied to hooks 34 through divergent arms 32 to create a wedging action which prevents detachment of hooks 34 from apertures 16.

Because the particular arrangement of clamp 20 and resilient strap 31 enables strap 31 to be adjusted in length to conform with the lid height before it is stretched, it is possible to exert a predetermined tensional force to lid 12 because of the resiliency of strap 31 which is independent of the lid height.

The presence of plate 27 between resilient strap arm 33 located in socket portion 21 and the latch arm 24 prevents the eccentric cam portion 26 from directly engaging the relatively soft, resilient strap arm 33, and hence prevents mutilation. The clamping force applied by eccentric cam portion 26 upon lowering of latch arm 24 is transmitted to strap arm 33 through the flat plate 27, thus eliminating all possibility of abrasion, mutilation or other damage to strap arm 33 by cam portion 26.

When it is desired to release the trunk lid 12, the latch arm 24 is raised from its lowered position shown in full lines in Figs. 1 and 3 to its raised position shown in dotted lines in Fig. 3. Upon raising of latch arms 24, the eccentric cam portion 26 is moved operatively out of socket portion 21 and out of operative engagement with plate 27, whereby to release the resilient strap arm 33. When released, the resilient tensional force transmitted to lid 12 by strap 31 is eliminated, the strap arm 33 being able to move upwardly through socket portion 21. The hooks 34 may then be detached from spaced apertures 16, and the hook formation 23 of clamp 20 may be removed from automobile bumper 14.

A modification of the resilient means interconnecting the clamp 20 and lid 12 is shown by Fig. 5. This modified structure includes a strap 45, preferably constructed of canvas material, connected at its top end to a D ring 46. A pair of coil springs 47, constituting resilient members are attached at their lower ends to ring 46 and carry at their upper ends a pair of opposed hooks 48. When attached to spaced apertures 16 in lid 12, the springs 47 will assume the upwardly divergent relation of Fig. 5. This device has the same resilient qualities and wedging action as the one previously described.

Although the invention has been described by making detailed reference to a single preferred embodiment, said detail is to be understood in an instructive, rather than in any restrictive sense, many variants being possible within the scope of the claims hereunto appended.

I claim as my invention:

1. A trunk lid-holding device for an automobile having a trunk compartment and a lid therefor, comprising a clamp element adapted to be attached to an automobile part below the trunk compartment, a resilient member extending between the lid and said clamp element, means on one end of said resilient member selectively attaching said member to said lid, the clamp element including a socket portion open at the top and bottom, the resilient member being slidably received in the socket portion, the resilient member extending through the open top of the socket portion and extending out the open bottom, the resilient member having its lower end extending through said socket portion to provide a portion capable of being pulled to place said resilient member under tension, and means on said clamp element for fixing said resilient member in adjusted position in said socket portion.

2. The combination and arrangement of elements as recited above in claim 1, but further characterized in that the resilient member is provided with an enlarged head portion at its lower end located below the socket portion and engaging the socket portion to prevent unintentional detachment of the clamp element and said resilient member.

3. A trunk lid-holding device for an automobile having a trunk compartment and a lid for said compartment in which an underdeck panel is provided with spaced apertures, comprising a clamp element adapted to be attached to an automobile bumper below the trunk compartment, a resilient strap of a resilient material extending between the lid and said clamp element, said strap being substantially of a Y-shaped construction having divergent strap arms at its upper end, means on each of said upper strap arms for engaging the spaced apertures of said lid deck panel to attach said strap to said lid, the clamp element including a socket portion through which the opposite lower end of said resilient member slidably extends, the lower end of said resilient strap being adapted to be pulled through the socket portion to adjust for the lid height and to place the strap under tension, and means on said clamp element for securing the resilient strap in adjusted position in said socket portion, the resilient strap being free of attachment to the clamp element except when secured in adjusted position by said clamp means.

4. A trunk lid-holding device for an automobile having a trunk compartment and a lid for such compartment in which an underdeck panel is provided with spaced apertures, comprising a clamp element having a hook formation adapted to be attached to the bumper of the automobile below the trunk compartment, the clamp element being provided with a socket portion that is open at the top and bottom, and provided with spaced ears, a latch arm located between and pivotally connected to said ears, the latch arm being provided with an eccentric cam portion extending selectively into said socket portion, a resilient strap of a resilient material extending between the lid and said clamp element, the resilient strap being substantially of a Y-shape having divergent uper strap arms and a depending strap arm, hooks pivotally connected to each of the divergent strap arms adapted to connect into the apertures of the lid deck panel to secure the resilient strap to said lid, the depending strap arm extending into the top of said socket portion, through said socket portion and extending out of the bottom of said socket portion, the lower end of the depending strap arm being adapted to be pulled to adjust the strap slidably in said socket portion to adjust the strap for the lid height and to stretch the resilient strap to apply a downward tensional force to the lid, and a plate located in said socket portion between the strap and the eccentric cam portion of the latch arm, the cam portion engaging the plate upon actuation of the latch arm to clamp the resilient strap in adjusted stretched position in said socket portion.

5. A trunk lid-holding device for an automobile having a trunk compartment and a lid therefor, comprising a clamp element adapted to be attached to an automobile part below the trunk compartment, a resilient means extending between the clamp element and the lid, said means consisting of a strap, the clamp element including means for slidably receiving the strap, a pair of resilient members attached to said strap and arranged in upwardly divergent relation, connectors on the resilient members for selectively attaching the means to the lid, the strap extending through said clamp element to provide a portion adapted to be pulled through the clamp element to adjust for the lid height and to place the divergently related resilient members under tension, and means on the clamp element for fixing the resilient means in adjusted stretched position.

6. The combination and arrangement of elements as recited above in claim 5, but further characterized in that the resilient members consist of coil springs, each spring having one end attached to the strap and having the other end adapted to connect with the lid, the springs being disposed in upwardly divergent relation.

References Cited in the file of this patent

UNITED STATES PATENTS

| | | |
|---|---|---|
| 221,747 | Smith | Nov. 18, 1879 |
| 1,348,970 | Thompson | Aug. 10, 1920 |
| 1,639,870 | Valsvig | Aug. 23, 1927 |
| 2,345,279 | Morehouse | Mar. 28, 1944 |
| 2,608,711 | Moore | Sept. 2, 1952 |
| 2,632,217 | Flora | Mar. 24, 1953 |

FOREIGN PATENTS

| | | |
|---|---|---|
| 12,989 | Great Britain | May 30, 1911 |
| 399 | Australia | Feb. 3, 1926 |